US009652385B1

(12) United States Patent
Chadwick et al.

(10) Patent No.: US 9,652,385 B1
(45) Date of Patent: May 16, 2017

(54) APPARATUS AND METHOD FOR HANDLING ATOMIC UPDATE OPERATIONS

(71) Applicant: ARM Limited, Cambridge (GB)

(72) Inventors: Gregory Andrew Chadwick, Cambridge (GB); Adnan Khan, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 14/953,093

(22) Filed: Nov. 27, 2015

(51) Int. Cl.
*G06F 12/08* (2016.01)
*G06F 9/52* (2006.01)
*G06F 9/38* (2006.01)
*G06F 12/0802* (2016.01)
*G06F 12/0815* (2016.01)

(52) U.S. Cl.
CPC ........ *G06F 12/0802* (2013.01); *G06F 9/3834* (2013.01); *G06F 9/528* (2013.01); *G06F 12/0815* (2013.01); *G06F 2212/1032* (2013.01)

(58) Field of Classification Search
CPC ..... G06F 9/528; G06F 9/3834; G06F 12/0815
See application file for complete search history.

(56) References Cited

U.S. PATENT DOCUMENTS 8,266,383 B1 * 9/2012 Minkin ................. G06F 12/084
710/39
2008/0091884 A1 * 4/2008 Piry ..................... G06F 12/0831
711/141
2010/0023706 A1 * 1/2010 Christie .................. G06F 9/466
711/150
2015/0242218 A1 * 8/2015 Shum ..................... G06F 9/3865
712/216
2016/0378662 A1 * 12/2016 Gschwind ........... G06F 12/0833
711/135

* cited by examiner

*Primary Examiner* — Edward Dudek, Jr.
(74) *Attorney, Agent, or Firm* — Nixon & Vanderhye P.C.

(57) ABSTRACT

An apparatus and method are provided for handling atomic update operations. The apparatus has a cache storage to store data for access by processing circuitry, the cache storage having a plurality of cache lines. Atomic update handling circuitry is used to handle performance of an atomic update operation in respect of data at a specified address. When data at the specified address is determined to be stored within a cache line of the cache storage, the atomic update handling circuitry performs the atomic update operation on the data from that cache line. Hazard detection circuitry is used to trigger deferral of performance of the atomic update operation upon detecting that a linefill operation for the cache storage is pending that will cause a chosen cache line to be populated with data that includes data at the specified address. The linefill operation causes the apparatus to receive a sequence of data portions that collectively form the data for storing in the chosen cache line. Partial linefill notification circuitry is used to provide partial linefill information to the atomic update handling circuitry during the linefill operation, and the atomic update handling circuitry is arranged to initiate the atomic update operation responsive to detecting from the partial linefill information that the data at the specified address is available for the chosen cache line. This can provide a performance benefit, by avoiding the need for the atomic update handling circuitry to await completion of the linefill operation before beginning the atomic update operation.

19 Claims, 9 Drawing Sheets

APPARATUS AND METHOD FOR HANDLING ATOMIC UPDATE OPERATIONS

BACKGROUND

The present technique relates to an apparatus and method for performing atomic update operations. When processing circuitry issues an atomic update operation specifying a memory address, this will typically require the data at that memory address to be obtained, some computation to be performed using that obtained data, and then a data value to be written back to the specified memory address dependent on the outcome of that computation. This sequence of steps needs to be performed atomically so that the data is not accessed by another operation whilst the update operation is being performed.

Many modern day data processing systems include one or more levels of cache between the processing circuits and memory, in which cached copies of the data at certain memory addresses can be retained to improve speed of access to that data by associated processing circuitry. One or more levels of cache may be provided for the exclusive use of an associated processing circuit, such caches often being referred to as local caches, whilst other levels of cache may be shared between multiple processing circuits, often being referred to as shared cache.

Considering the earlier mentioned atomic update operations, when it is determined that the specified address relates to data that has been cached in a local cache, it may be possible for that atomic update operation to be performed using the local cache contents, in such a situation the atomic update operation being referred to as a near atomic operation. However, before the near atomic operation can be performed, certain pending cache access operations may need to be completed, and this can give rise to a performance impact in the handling of the atomic update operation. It would be desirable to provide a mechanism for alleviating this performance impact.

SUMMARY

In a first example configuration, there is provided an apparatus comprising: a cache storage to store data for access by processing circuitry, the cache storage having a plurality of cache lines; atomic update handling circuitry to handle performance of an atomic update operation in respect of data at a specified address, the atomic update handling circuitry being arranged, when data at the specified address is stored within a cache line of the cache storage, to perform the atomic update operation on the data from that cache line; hazard detection circuitry to trigger deferral of performance of the atomic update operation upon detecting that a linefill operation for the cache storage is pending that will cause a chosen cache line to be populated with data that includes data at the specified address, the linefill operation causing the apparatus to receive a sequence of data portions that collectively form the data for storing in the chosen cache line; partial linefill notification circuitry to provide partial linefill information to the atomic update handling circuitry during the linefill operation; and the atomic update handling circuitry being arranged to initiate the atomic update operation responsive to detecting from the partial linefill information that the data at the specified address is available for the chosen cache line.

In a second example configuration, there is provided a method of handling atomic update operations within an apparatus having a cache storage to store data for access by processing circuitry, the cache storage having a plurality of cache lines, the method comprising: employing atomic update handling circuitry to handle performance of the atomic update operation in respect of data at a specified address, the atomic update handling circuitry being arranged, when data at the specified address is stored within a cache line of the cache storage, to perform the atomic update operation on the data from that cache line; triggering deferral of performance of the atomic update operation upon detecting that a linefill operation for the cache storage is pending that will cause a chosen cache line to be populated with data that includes data at the specified address; performing the linefill operation to cause the apparatus to receive a sequence of data portions that collectively form the data for storing in the chosen cache line; providing partial linefill information to the atomic update handling circuitry during the linefill operation; and initiating the atomic update operation responsive to the atomic update handling circuitry detecting from the partial linefill information that the data at the specified address is available for the chosen cache line.

In a yet further example configuration, there is provided an apparatus comprising: cache storage means for storing data for access by processing circuitry, the cache storage means having a plurality of cache lines; atomic update handling means for handling performance of an atomic update operation in respect of data at a specified address, the atomic update handling means, when data at the specified address is stored within a cache line of the cache storage means, for performing the atomic update operation on the data from that cache line; hazard detection means for triggering deferral of performance of the atomic update operation upon detecting that a linefill operation for the cache storage means is pending that will cause a chosen cache line to be populated with data that includes data at the specified address, the linefill operation causing the apparatus to receive a sequence of data portions that collectively form the data for storing in the chosen cache line; partial linefill notification means for providing partial linefill information to the atomic update handling means during the linefill operation; and the atomic update handling means for initiating the atomic update operation responsive to detecting from the partial linefill information that the data at the specified address is available for the chosen cache line.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
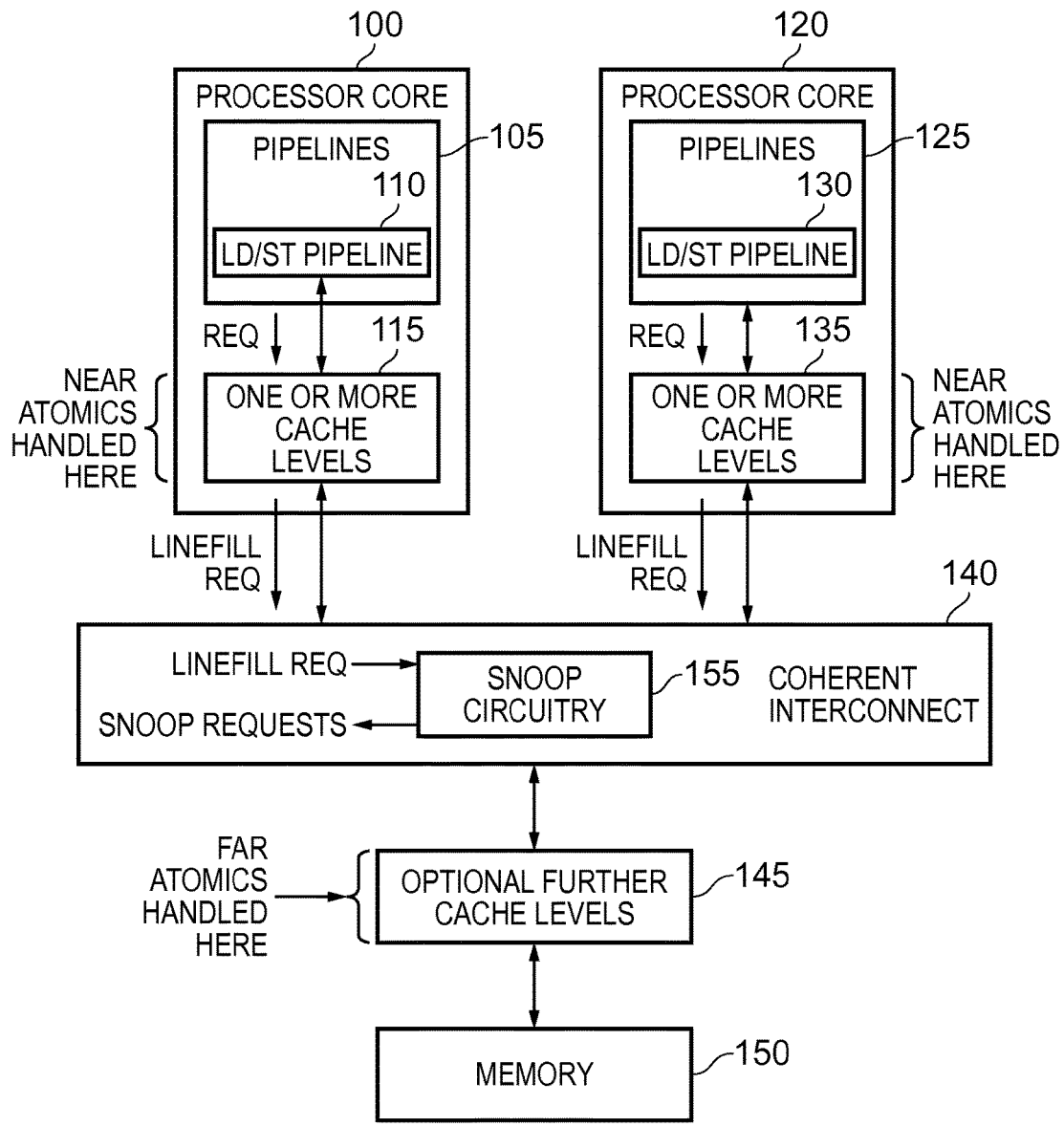
FIG. 1 is a block diagram of a system in which the techniques of the described embodiments may be employed.

Before discussing the embodiments with reference to the accompanying figures, the following description of embodiments is provided.

In one embodiment, an apparatus is provided that has cache storage for storing data for access by associated processing circuitry, with the cache storage having a plurality of cache lines. Atomic update handling circuitry is then used to handle performance of an atomic update operation in respect of data at a specified address. When it is determined that data at that specified address is stored within a cache line of the cache storage, the atomic update handling circuitry is arranged to perform the atomic update operation on the data from that cache line.

Hazard detection circuitry is used to detect certain hazard conditions, and with regard to the atomic update operation is arranged to trigger deferral of performance of that atomic update operation upon detecting that a linefill operation for the cache storage is pending, in a situation where that linefill operation will cause a chosen cache line to be populated with data that includes data at the specified address. In such a situation, it will be appreciated that once the linefill operation has been completed, the cache will then contain the data at the specified address, allowing the atomic update operation to be performed directly on the data from the cache line.

However, since during a linefill operation an entire cache line's worth of data is written into the cache, it can take a significant period of time for the linefill operation to complete. In particular, during the linefill operation the apparatus will receive from the memory system (either from a lower level in the cache hierarchy or from main memory) a sequence of data portions that collectively form the data for storing in the chosen cache line, and the time taken to receive all of the required data portions and store those portions to the cache line in order to complete the linefill operation can be significant.

In accordance with the described embodiment, rather than having to wait for the linefill operation to complete, and the hazard condition to thereby be removed, before performing the atomic update handling circuitry, instead partial linefill notification circuitry is provided which provides partial linefill information to the atomic update handling circuitry during the linefill operation. The atomic update handling circuitry is then arranged to initiate the atomic update operation in response to detecting from the partial linefill information that the data at the specified address is available for the chosen cache line.

In many situations, this will enable the atomic update operation to be initiated before the linefill operation has been completed, hence alleviating the potential performance impact that would otherwise result from having to await confirmation from the hazard detection circuitry that the linefill operation has completed and the hazard is hence no longer present.

The point at which the data at the specified address is determined to be available for the chosen cache line may vary dependent on embodiment. In one embodiment the data at the specified address is available for the chosen cache line once it has been stored within the chosen cache line. In one particular example of such an embodiment, the individual data portions are written to the cache line as they are received from the memory system, and hence the partial linefill information can be based on the storage of each data portion into the cache line.

However, in an alternative embodiment, the data at the specified address is considered available for the chosen cache line once it has been locally buffered within the apparatus for storing within the chosen cache line. In one such embodiment the data portions are still received in a sequence from the memory system, but they are buffered locally so that multiple data portions can then be written into the chosen cache line at the same time (in one particular embodiment the entire cache line's data is updated at the same time using the buffered data portions). When adopting such an approach, it is possible for the partial linefill information to be based on the availability of the data portions in the local buffer, without needing to wait for the cache line to actually be written to during the linefill operation.

The partial linefill information can take a variety of forms. In one embodiment, the partial linefill notification circuitry is arranged to provide the partial linefill information to the atomic update handling circuitry to identify when each data portion is available for the chosen cache line during the linefill operation, and the atomic update handling circuitry is arranged to determine from the partial linefill information when the linefill operation has progressed to a point where the data at the specified address is available for the chosen cache line.

Hence, in this embodiment each time a data portion becomes available for the chosen cache line during the linefill operation, the atomic update handling circuitry is notified. Based on this information, the atomic update handling circuitry can then determine when the data at the specified address relevant to the atomic update operation is available for the chosen cache line, and at that point can initiate the atomic update operation even though the linefill operation may not yet have completed.

As an alternative to the above approach, the partial linefill notification circuitry may be arranged to determine when the linefill operation has progressed to a point where the data portions available for the chosen cache line include the data at the specified address, and then to issue as the partial linefill information an indication that the data at the specified address is available for the chosen cache line. Hence, in this embodiment, rather than the atomic update handling circuitry being notified as each data portion becomes available for the chosen cache line, the partial linefill notification circuitry instead keeps track of the progress of the linefill operation and determines when a point has been reached where the data at the specified address required by the atomic update operation is available for the chosen cache line, and at that point provides a partial linefill notification to the atomic update handling circuitry. The atomic update handling circuitry can then respond to receipt of that partial linefill information by initiating performance of the atomic update operation.

The partial linefill information can include a variety of pieces of information dependent on embodiment. In one embodiment, the partial linefill information comprises an address portion indicative of a corresponding data portion that is available for the chosen cache line during the linefill operation. Hence, based on the address portion information, the atomic update handling circuitry can then determine whether the corresponding data portion that is available for the chosen cache line includes the data at the specified address relevant to the atomic update operation.

In one embodiment, the atomic update handling circuitry may comprise a buffer having a plurality of buffer entries, where each buffer entry may be used to store information relating to a pending operation. The partial linefill notification circuitry may be provided with information about which buffer entry any particular pending atomic update operation is associated with, and in one embodiment the partial linefill information then comprises an indication of the buffer entry for which the partial linefill information is being provided. This enables the atomic update handling circuitry to readily determine for which atomic update operation the partial linefill information is being provided.

In one embodiment, once the atomic update handling circuitry detects in response to the partial linefill information that the atomic update operation can be initiated, it will issue a request to access the required data, whereafter the required update operation on that data will be performed, typically resulting in the updated data being written back to the cache line.

However, in an alternative embodiment a data forwarding path may be coupled to the atomic update handling circuitry that can be used to provide to the atomic update handling circuitry, as at least part of the partial linefill information, the corresponding data portion that is available for the chosen cache line. Accordingly, in such an embodiment, the need to read the data (from the cache or local buffer) may be avoided, and instead the data provided directly over the data forwarding path can be used.

In one embodiment, a dedicated data forwarding path may be provided for the atomic update handling circuitry. However, in an alternative embodiment the atomic update handling circuitry can be incorporated within a component that already has such a data forwarding path to it. For example, in one embodiment the atomic update handling circuitry may be incorporated within a load/store pipeline of the processing circuitry, and often a load/store pipeline will be provided with a forwarding path to enable data retrieved via a linefill operation to be provided directly to the processor. That forwarding path can then be reused by the atomic update handling circuitry.

The atomic update operation can take a variety of forms, but in one embodiment comprises a read-modify-write operation, where the data at the specified address, as available for the chosen cache line, is obtained, a computation is performed to produce a modified data value, and the modified data value is written back to the chosen cache line.

Such an atomic update operation can take a variety of forms, for example allowing a number of different computations to be specified by different forms of the atomic update operation. In addition, the atomic update operations can be identified as being store operations or load operations.

In one embodiment, when the atomic update operation is an atomic load operation, then in addition to performing the above described read-modify-write operation, the obtained data at the specified address is output to the processing circuitry. Hence, the processing circuitry receives the original data prior to it being modified by the read-modify-write operation.

The above performance improvements that can be realised through use of the partial linefill information to enable the atomic update operation to be performed earlier than it might otherwise be able to if it awaited completion of the relevant linefill operation, can be particularly useful in association with atomic load operations, since it is often the case that a subsequent operation to be performed by the processing circuitry will be awaiting receipt of that data from the atomic load operation. By reducing the latency of the atomic load operation, this reduces the performance impact on the subsequent operation that is dependent on the loaded data.

Whilst the atomic update operation can be a read-modify-write operation, it may alternatively take other forms. For example in one embodiment the atomic update operation comprises obtaining the data at the specified address as available for the chosen cache line, performing a computation to produce a result value, and selectively writing a modified data value back to the chosen cache line dependent on the result value. An example of such an atomic update operation would be a compare and swap operation, where the data value obtained from the specified address is compared with another value specified by the atomic update operation (for example the contents of a specified register), and then dependent on the result of the comparison, the data value as stored at the specified address may be swapped for a different data value. Again, by employing the above described techniques to reduce the latency of the atomic update operation, this can give rise to significant performance benefits.

In one embodiment cache access circuitry is used to store the data into the chosen cache line during the linefill operation. The cache access circuitry may update the cache line one data portion at a time as each data portion becomes available, or alternatively the data portions may be buffered locally and then the cache access circuitry may write multiple data portions (in one embodiment all of the data portions constituting the data of the cache line) to the cache line in one go.

In one embodiment, the cache access circuitry is arranged, whilst the atomic update operation is being performed, to lock the chosen cache line from being accessed at least for any operations that could compromise atomicity of the atomic update operation.

In one embodiment, any remaining parts of the linefill operation are allowed to continue, since they will not relate to the data that is the subject of the atomic update operation, and accordingly could not comprise the atomicity. Further, hazard checking mechanisms employed for access requests issued by the associated processing circuitry may be sufficient to ensure that any access requests that could comprise atomicity are stalled waiting for the atomic update operation to complete, hence not requiring the cache line to specifically be locked. However, certain types of operation could potentially compromise atomicity of the atomic update operation. One example is snoop operations that are issued to the apparatus from snoop circuitry within a system incorporating that apparatus. The snoop circuitry is effectively an external source of access requests (in the form of snoop requests) to the cache structure. In accordance with the above described embodiment, the cache access circuitry is arranged to prevent such a snoop request accessing the chosen cache line whilst the atomic update operation is being performed in respect of that cache line. Once the atomic update operation is complete, then the cache access circuitry will allow the snoop operation to proceed.

The atomic update handling circuitry can be a dedicated circuit provided purely for handling atomic update operations. However, in an alternative embodiment it can be provided as part of an existing structure in order to make use of certain components of that existing structure. In one particular embodiment, the atomic update handling circuitry is provided within store buffer circuitry used to process store operations requested by the processing circuitry. As part of the process required to handle standard store operations, the store buffer circuitry will be able to access the cache in order to write data into selected cache lines. This functionality can be utilised by the atomic update handling circuitry when handling atomic update operations since, as will be apparent from the above discussion, these will typically involve not just reading data from the cache, but also writing data (after it has been modified) back to the cache.

In one embodiment, the atomic update handling circuitry is arranged, when data at the specified address is determined not to be stored within a cache line of the cache storage and there is no pending linefill operation for the cache storage that will cause a chosen cache line to be populated with data that includes data at the specified address, to output the atomic update operation for handling by components external to the apparatus. In contrast to atomic update operations that can be performed directly using the contents of the cache storage, which will be referred to herein as near atomic operations, atomic update operations that are output for handling by components external to the apparatus will be referred to as far atomic operations.

Particular embodiments will now be described with reference to the Figures.

FIG. 1 illustrates an example of a system in which an apparatus of the described embodiments may be employed. For ease of illustration, the system includes only two processor cores 100, 120, but additional processor cores may be provided, as indeed can other master devices that may or may not include their own local caches. The core 100 has various processor pipelines 105, one of which is a load/store pipeline 110 used to handle load and store operations. The load/store pipeline 110 can access one or more cache levels 115 provided locally within the core 100 by issuing access requests specifying memory addresses. The core 120 is constructed similarly, having pipelines 125 including a load/store pipeline 130 that can issue access requests specifying memory addresses to one or more cache levels 135 provided locally within the core 120. In the embodiment described herein, it will be assumed that the one or more cache levels 115, 135 include a level 1 data cache. Further lower levels of cache may be provided within the blocks 115, 135, such as local level 2 caches. Irrespective of whether there are additional levels of cache, or just a level 1 cache, in each of the blocks 115, 135, in the event of a miss within the local cache levels, a linefill request will be propagated out to the coherent interconnect 140 along with the memory address. The coherent interconnect 140 includes snoop circuitry 155 which is used to implement a cache coherency protocol in order to ensure that data coherency exists between the various copies of data that may be held by the separate processor cores' local caches. In particular, by way of example, it is important that if processor core 120 has a data value in its local caches 135 which is more up-to-date than data held in any shared lower hierarchical cache levels 145 and/or memory 150, then if the processor core 100 requires access to that data and detects a miss in its local caches 115, it can be ensured that the processor core 100 will access the most up-to-date data.

The snoop circuitry 155 seeks to maintain a record indicating which cores it understands to have cached copies of data, that record keeping track of the memory addresses of the data and the cores that it believes to have locally cached that data. Accordingly, in the event of a linefill request being propagated from one of the processor cores along with a memory address, the snoop circuitry 155 can check its local record to see if that memory address is identified in its record, and if so which processor cores are indicated as having a copy of that data. It can then issue a snoop request to the relevant processor core(s) in order to cause each such processor core to access its local cache and perform a required coherency action in respect to its copy of the data. This may involve invalidating the local copy, and/or may involve that processor core outputting its copy of the data back to the snoop circuitry, so that it can then be returned to the requesting processor core. By way of example, it will hence be appreciated that if a miss occurs in the one or more cache levels 115 for an access request made by the processor core 100, and that the most up-to-date version of the data at that address resides in the local cache hierarchy 135 of processor core 120, this will be detected by the snoop circuitry 155, and via the snoop request that data can be retrieved and then provided back to the processor core 100.

In addition to issuing standard load or store operations to the associated cache levels, the load/store pipelines 110, 130 can also issue other types of operation which require memory accesses to be performed. One particular example is an atomic update operation as discussed earlier. Such an atomic update operation will typically require data at a specified memory address to be accessed, some manipulation operation to be performed using that data, and then an updated data value to be written back to the memory address. In some alternative examples of an atomic update operation, the write back of a data value to the memory address following the manipulation may depend on the result of that manipulation operation.

When such an atomic update operation is issued by a load/store pipeline, then circuitry associated with the first level of cache within the associated local cache levels 115, 135 will determine whether the data value at the specified address of the atomic update operation is cached exclusively within the local cache. If it is not currently exclusively cached within the local cache, it may be possible to use the snoop functionality to render the local cache's copy an exclusive copy. If the data value in question is exclusively cached within the local cache, then the atomic update operation can be performed locally with respect to the cache's contents, such an atomic update operation being referred to as a near atomic operation. Further, if it is detected that the data value of interest is not currently in the cache, but is the subject of a pending linefill operation to the cache, and hence in due course will be present in the cache, then the atomic update operation can be deferred awaiting performance of the linefill operation. This again enables the atomic update operation to be handled as a near atomic operation. As will be discussed in more detail with reference to the embodiments below, rather than having to wait for the entire linefill operation to complete, using the techniques of the embodiments described hereafter it is possible for the atomic update operation to begin before the full linefill operation has completed in many situations, hence providing a performance improvement.

If it is determined that the specified address for the atomic update operation does not have its associated data cached within the local cache structure, and is not the subject of a pending linefill operation, then that atomic update operation is propagated from the relevant processor core 100, 120 for performance at a lower cache level 145 or memory 150. An atomic update operation that needs to be handled in that manner may be referred to as a far atomic operation.

Figure 2:
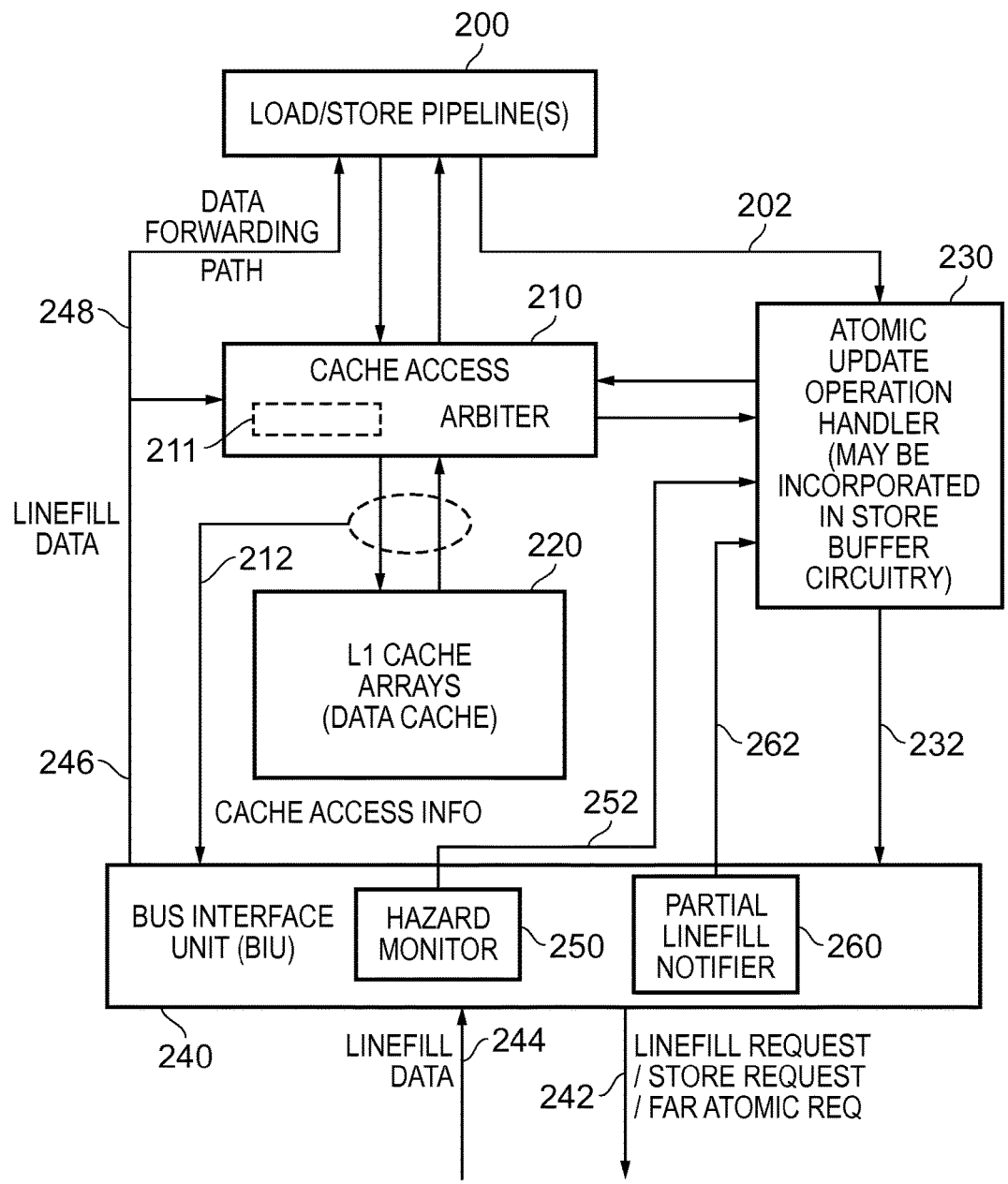
FIG. 2 is a block diagram illustrating in more detail components provided in association with a level 1 data cache in accordance with one embodiment.

FIG. 2 is a block diagram illustrating components provided in association with the level 1 data cache in accordance with one embodiment, and in particular illustrating how atomic update operations are handled. The level 1 data cache arrays 220 are accessed under the control of a cache access arbiter 210 that can receive cache access requests from a variety of sources. For example, for a load access request, the load/store pipeline 200 may issue an access request to the cache access arbiter to cause a lookup to be performed within the level 1 cache arrays 220. In the event of a cache hit, then the requested data can be returned to the load/store pipeline 200 from the level one cache arrays 220. Store operations are typically only output by the load/store pipeline once they reach the commit stage of the pipeline, and at that point are forwarded to a store buffer. Although the store buffer is not shown separately in FIG. 2, in one embodiment the atomic update operation handler 230 is actually provided as part of the store buffer circuitry. For a store operation, the store buffer may then cause the cache access arbiter 210 to perform a cache lookup in order to determine whether the data the subject of the store operation is within the cache, and if so the write data provided for the store operation can be written directly into cache (assuming the store operation relates to a cacheable store request).

As shown by the path 212, a bus interface unit (BIU) 240 is able to monitor the various cache accesses made by the cache access arbiter 210, and the responses thereto. If a miss is detected for a cache access, then the BIU 240 can issue a linefill request over path 242 to the lower levels of the cache hierarchy in order to cause the required to be returned as linefill data over path 244. As the linefill data is returned, it can be forwarded over path 246 to the cache access arbiter 210 in order to cause the requested data to be stored within a chosen cache line of the cache array. If required, the data can also be passed directly back to the load/store pipeline 200 via a data forwarding path 248.

Typically the cache line width exceeds the data bus width on the path 244. Hence, when retrieving a cache line's worth of data from the lower levels of the cache hierarchy in order to perform a linefill operation, that data will typically be returned as a sequence of data portions. In one embodiment, as each data portion is returned, it can be passed over path 246 to cause the cache access arbiter 210 to perform an access to the relevant cache line of the cache array in order to write that data portion into the cache line. In accordance with such an approach, multiple cache accesses will be performed to the cache array by the cache access arbiter 210 in order to populate the full cache line's worth of data during the linefill operation.

In an alternative embodiment, a local buffer 211 may be maintained by the cache access arbiter, so that as each data portion for the linefill is returned, it is stored within the buffer 211, and then when the full cache line's worth of data is available, an access is then performed into the cache arrays in order to store that cache line's worth of data into the chosen cache line.

Due to the BIU 240 being aware of the various accesses being performed in respect of the cache arrays 220 via the cache access information passed over path 212, the BIU can keep track of potential hazards that may arise, and in particular can be provided with hazard monitoring circuitry 250 to track those hazards and issue appropriate control signals in the event of a hazard being detected. As one example of a hazard, whilst a linefill operation is pending, it may be the case that the cache access arbiter issues an access request in relation to a memory address that is contained within the range of addresses that are the subject of the linefill operation. If the data has not yet been written into the cache, this would cause a miss to be detected in the cache, but if the BIU detects that the data will be available once the linefill operation is complete, it can notify the relevant component in order to cause the cache access result to be ignored by that component, and instead for the cache access to be retried later by that component.

Considering atomic update operations, these will typically be routed via the load/store pipeline 200 over the path 202 to the atomic update operation handler 230. Whilst the atomic update operation handler 230 may be a separate functional block associated with the cache, in one embodiment it can be incorporated as part of the store buffer circuitry, and make use of some of the components already provided within the store buffer circuitry. For example, the store buffer circuitry will typically comprise a number of buffer slots for storing pending store operations, and those buffer slots can also be utilised to store pending atomic update operations. The atomic update operations have some properties similar to a store operation, since as part of their functionality they will typically require a write to be performed to a cache line within the cache array, assuming the atomic update operation can be handled as a near atomic operation. Due to the write performed during performance of the atomic update operation, then typically such atomic update operations will also only be routed over the path 202 from the load/store pipeline once the commit stage of the load/store pipeline has been reached.

When the atomic update operation handler determines that it has an atomic update operation to perform, it can issue a request to the cache access arbiter 210 to cause the cache access arbiter to perform a lookup within the level one cache arrays 220. In the event of a hit, then the requested data can be returned to the atomic update operation handler, where the atomic update operation can then be performed on that data. This will typically involve performing an update operation using the data retrieved, resulting in the generation of result data. In one embodiment, the result data is then written back to the level one cache array via the atomic update operation handler 230 issuing a write request to the cache access arbiter 210 to cause the relevant cache line to be accessed and the data written. Dependent on the type of atomic update operation, then in some instances it may be the case that the result of the update operation is first analysed and, dependent on the value of that result, this may then dictate whether the current content of the cache line is updated as a final step of the atomic update operation.

Due to the earlier discussed functionality of the BIU 240, if when the cache access arbiter 210 performs the initial lookup operation in response to the atomic update operation handler's request, a miss is detected in the level one cache array, the BIU can nevertheless detect with reference to the hazard monitoring function whether there is a pending linefill request covering the specified address for the atomic update operation. In that event, the hazard monitoring circuitry 250 is arranged to send a control signal over path 252 to the atomic update operation handler 230 to trigger deferral of performance of the atomic update operation. In effect, the atomic update operation handler then ignores the miss result returned from the cache access arbiter 210, and instead awaits a further control signal from the BIU 240 before reinitiating performance of the atomic update operation.

Due to the fact that the linefill data is typically received over path 244 in multiple cycles, one data portion at a time, it will be appreciated that a linefill operation potentially takes significant time to perform. If the atomic update operation handler 230 were to wait for the linefill operation to complete, at which point the hazard would then be removed, and a notification to that effect could be passed from the hazard monitor 252 to the atomic update operation handler 230, this could potentially cause the atomic update operation to be stalled for a significant period of time. In the embodiment described with reference to FIG. 2, this problem is alleviated through use of a partial linefill notification block 260. In particular, in one embodiment, as each portion of data for a linefill operation is returned over path 244 and routed over path 246 to the cache access arbiter 210, then a notification of that fact can be issued over path 262 to the atomic update operation handler 230.

The partial linefill information routed over path 262 to the atomic update operation handler 230 can take a variety of forms, but in one embodiment provides some address information sufficient to identify the range of addresses associated with the data portion. In one embodiment, it is also arranged to identify the buffer slot in which the relevant atomic update operation that has been stalled due to the pending linefill operation is located. In particular, the slot information can be passed to the BIU 240 at the time the original hazard is detected, so that the BIU can associate the slot identifier with the pending linefill, and accordingly the partial linefill notifier 260 can issue slot-specific partial linefill notifications over path 262.

As each piece of partial linefill information is returned over path 262 to the atomic update operation handler 230, it can assess whether the associated portion of data that has been provided to the cache access arbiter 210 includes the data that is the subject of the stalled atomic update operation (i.e. whether the address range associated with that portion of data includes the specified address for the atomic update operation in question).

As a result, it will be appreciated that, even prior to the linefill operation completing, a situation may be detected where a portion of data that has been returned as part of a linefill operation already includes the data that the atomic update operation needs. At that point, the atomic update operation handler 230 can reissue its access request to the cache access arbiter 210. In the embodiment where each portion of data is written directly into the chosen cache line as it is received by the cache access arbiter, it will be appreciated that at this point a hit will be detected within the relevant cache line of the cache array. Similarly, if the buffer 211 is used to temporarily buffer up the portions of data as they are returned until a full cache line's worth of data has been received, before writing the data into the cache line, a hit can still be detected, since in one embodiment, as part of the cache access lookup operation, the cache access arbiter 210 will also look within buffer 211. Accordingly, at this point the required data can be returned to the atomic update operation handler to enable the atomic update operation to then be performed.

In due course, once the modifying step of the atomic update operation has been performed, there will typically be data to write back into the chosen cache line, and at this point the atomic update operation handler will issue a suitable request to the cache access arbiter 210 along with the data to be written. If by that stage the original data has been stored within the level one cache arrays, then the cache access arbiter 210 can merely access the relevant cache line and update the data concerned. If the relevant data is still within the buffer 211, then it can be overwritten within the buffer with the newly supplied data from the atomic update operation handler 230, so that in due course once the data is written into the cache arrays this will include the updated data generated by the atomic update operation handler.

In the event that, when the initial request is sent from the atomic update operation handler 230 to the cache access arbiter 210 for a particular atomic update operation, a miss is detected in the level one cache arrays 220, and the BIU 240 does not detect any pending linefill operation, in one embodiment the atomic update operation will then be handled as a far atomic operation. Accordingly, details of the atomic update operation will be output from the atomic update operation handler 230 over path 232 to the BIU 240, from where that far atomic request will then be issued over path 242 to the lower levels of the cache hierarchy.

For standard store operations that miss within the level one cache, these can also be propagated onto the lower levels of the cache hierarchy via the BIU 240 as store requests over path 242.

Figure 3:
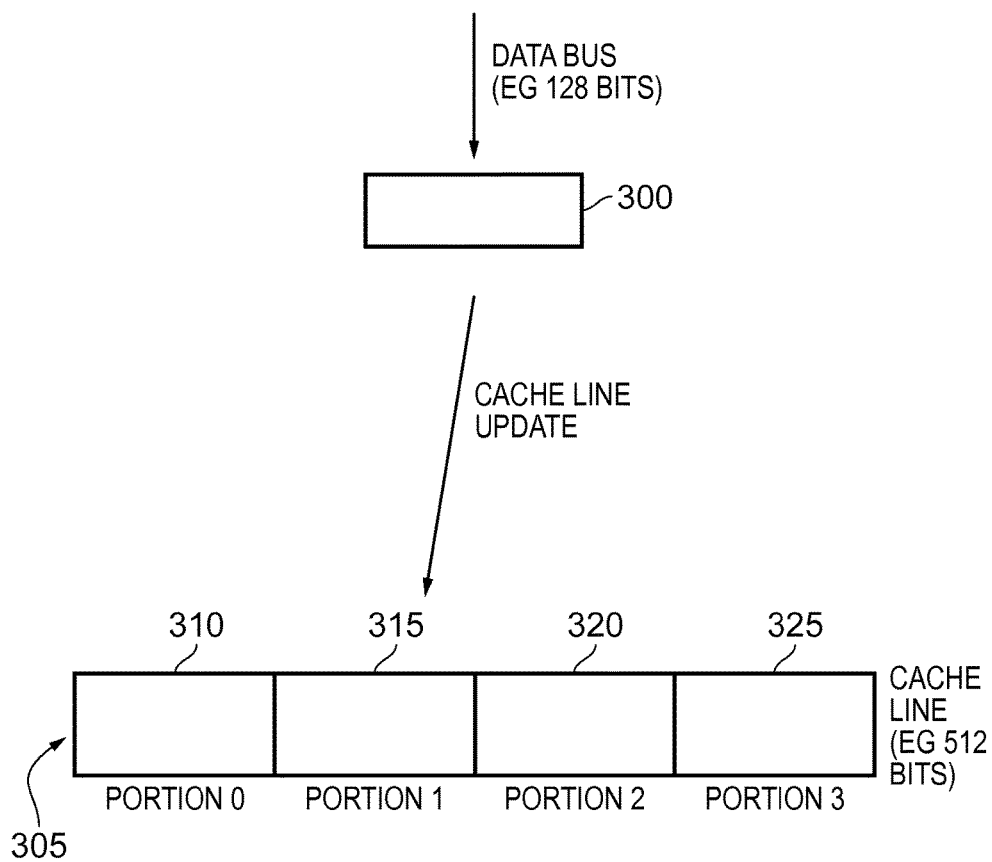
FIG. 3 schematically illustrates how a linefill operation may be performed using a plurality of cache accesses in accordance with one embodiment.

FIG. 3 schematically illustrates how the individual data portions constituting a cache line are received and processed. As shown by the block 300, individual data portions will be received over path 244 by the BIU 240. In the embodiment where the cache is accessed independently for each data portion, then the cache line 305 will be written to multiple times as each data portion is received in order to populate the various cache line portions 310, 315, 320, 325. In this particular example, it is assumed that a cache line has a length of 512 bits, and each data portion received over path 244 is 128 bits in length, hence requiring four separate accesses to the cache line in order to fully populate the cache line data. When using the buffer arrangement 211 within the cache access arbiter, then it will be appreciated that it will similarly take four separate operations to fill the buffer 211 with the cache line's worth of data, at which point it can then be written directly into the chosen cache line via a single cache access, assuming the bandwidth of the path between the cache access arbiter 210 and the level one cache arrays 220 supports the writing of an entire cache line's worth of data in one cycle.

Figure 4:
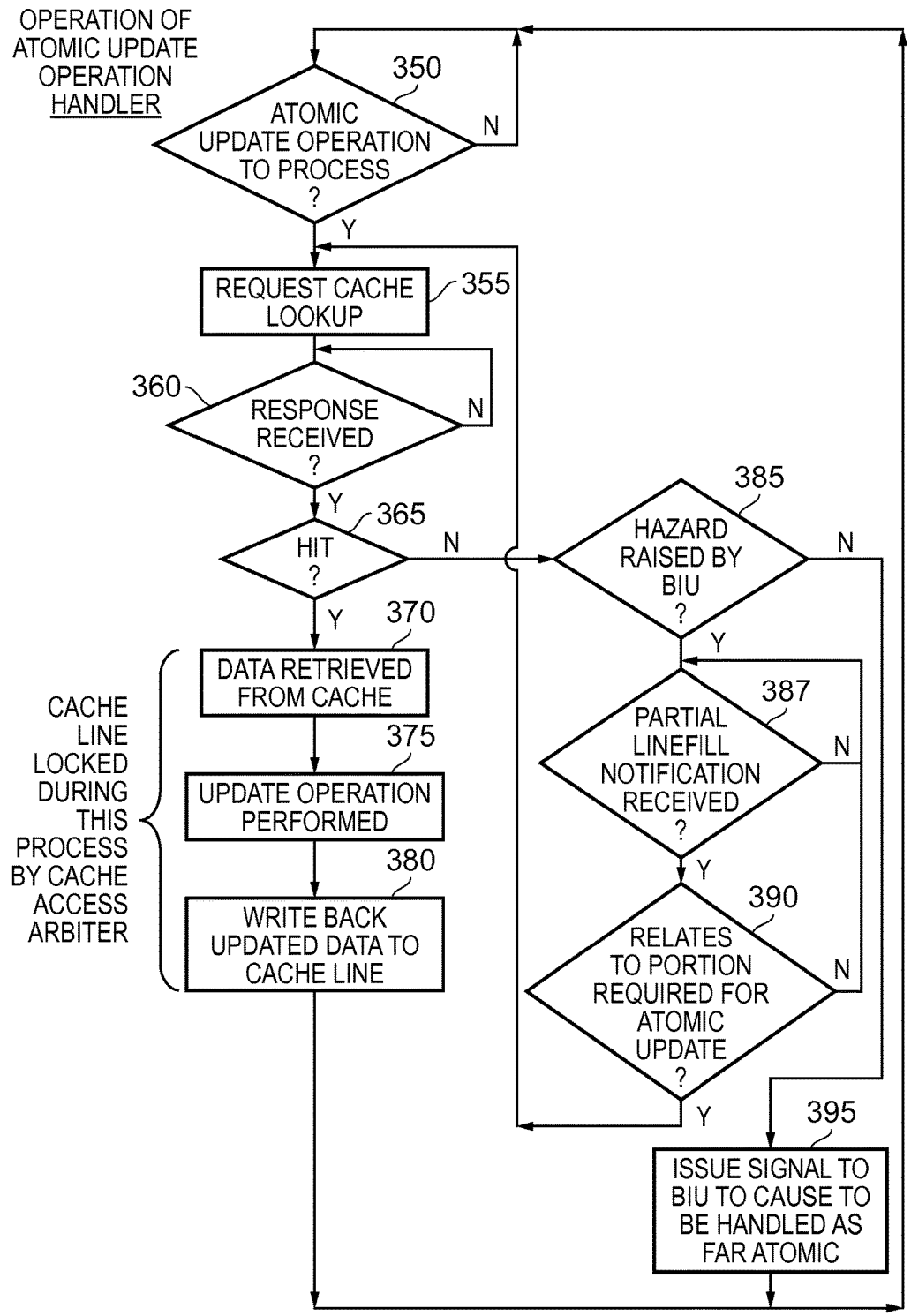
FIG. 4 is a flow diagram illustrating the operation of the atomic update operation handler of FIG. 2 in accordance with one embodiment.

FIG. 4 is a flow diagram illustrating the operation of the atomic update operation handler 230 in accordance with one embodiment. At step 350, it is determined whether there is an atomic update operation to process. When there is, the process then proceeds to step 355, where a cache lookup is requested, by issuance of an appropriate signal to the cache access arbiter 210. This will cause the cache access arbiter to perform a lookup within the level one cache arrays 220, and in due course provide a response back to the atomic update operation handler.

At step 360, that response is awaited, and when received it is then determined whether the response indicates that a hit has been detected within the cache arrays. If so, then typically the data will also be returned to the atomic update operation handler as part of the response, causing the required data to be retrieved from the cache at step 370. At step 375, an update operation may be performed, the exact form of the update operation being dependent on the type of atomic update operation. This may for example involve some arithmetic logic computation being performed using the data retrieved from the cache, and one or more other values specified as part of the atomic update operation. This results in the generation of result data, which may then be written back as updated data to the relevant cache line at step 380. In one embodiment, this involves the atomic update operation handler issuing a write access request to the cache access arbiter 210 to cause the relevant cache line to be written with the updated data.

As indicated in FIG. 4, during the performance of steps 370, 375, 380, the relevant cache line may be locked by the cache access arbiter 210 to prevent any conflicting access to that line taking place that could comprise the atomicity of the atomic update operation. For accesses requested directly by the load/store pipeline 200, no specific action will typically be required by the cache access arbiter, since it will typically be the case that a check will be made against the contents of the store buffer entries (including the entries maintained by the atomic update operation handler) in order to detect whether there are any pending requests that cover an address of an access to be requested by the load/store pipeline, and in that event that access will be stalled (or accessed with reference to the store buffer contents). However, there are some accesses which are requested by components external to the relevant processor core, and these do need to be prevented from taking place via the cache access arbiter 210. One example is a snoop request issued by the snoop circuitry 155 of FIG. 1, which will typically be forwarded to the cache access arbiter 210 to cause the lookup to be performed within the cache. By locking the relevant cache line during the period when steps 370, 375, 380 are being performed, this will prevent a snoop request seeking to access that relevant cache line from being processed whilst the atomic update operation is being performed. When the cache line is subsequently unlocked following completion of step 380, then the snoop request can be processed.

If at step 365 a hit is not detected in the cache, it is then determined at step 385 whether a hazard has been raised by the BIU 240 over path 252. As discussed earlier, this will be the case if the hazard monitor detects that there is a pending linefill operation to a series of addresses that includes the specified address for the atomic update operation. If a hazard has been raised by the BIU, then the process proceeds to step 387, where partial linefill information is awaited over path 262. When a partial linefill notification is detected at step 387, then it is determined at step 390 whether it relates to the portion of data required for the atomic update operation. As discussed earlier, the atomic update operation handler can detect this situation using address information provided as part of the linefill notification. In particular, that address information will specify the range of addresses associated with the data portion retrieved over path 244, and it can then be determined whether that includes the specified address of the atomic update operation. If not, then the process returns back to step 387 to await the next partial linefill notification.

However, once it is determined at step 390 that the portion of data associated with the partial linefill notification includes the data relevant for the atomic update operation, then the process proceeds to step 355 where the atomic update operation handler reissues its request to the cache access arbiter 210. This time a hit will be detected (either directly in the level one cache arrays, or within the buffer 211), and accordingly the process will proceed via steps 370, 375, 380 in order to cause the atomic update operation to be performed. The process then returns to step 350.

If at step 385 no hazard is detected, then this means that the atomic operation should be output over path 232 for forwarding via the BIU 240 over path 242 for handling at a lower stage of the cache hierarchy. Accordingly, the process proceeds to step 395 where the atomic update operation handler 230 issues a signal to the BIU 240 to cause the atomic update operation to be handled by a lower level of the cache hierarchy. Typically, this may cause the operation to be handled as a far atomic operation by one of the lower levels of cache 145.

Whilst in the above example arrangement, the partial linefill notifier 260 is arranged to issue a partial linefill notification as each portion of data is received over path 244 and routed over path 246 into the cache access arbiter 210, in an alternative embodiment the analysis as to whether the portion of data relates to the address of interest to the atomic update operation could instead be performed within the BIU. In that event, the partial linefill notifier 260 would only need to issue a partial linefill notification over path 262 to the atomic update operation handler once it has been determined that a portion of data has been retrieved that includes the data of interest to the atomic update operation. When considering the process of FIG. 4, this would remove decision step 390 from being part of the operation of the atomic update operation handler. Instead, based on slot information associated with the partial linefill notification on path 262, the relevant atomic update operation could be identified, and then the process returns to step 355.

Figure 5A:
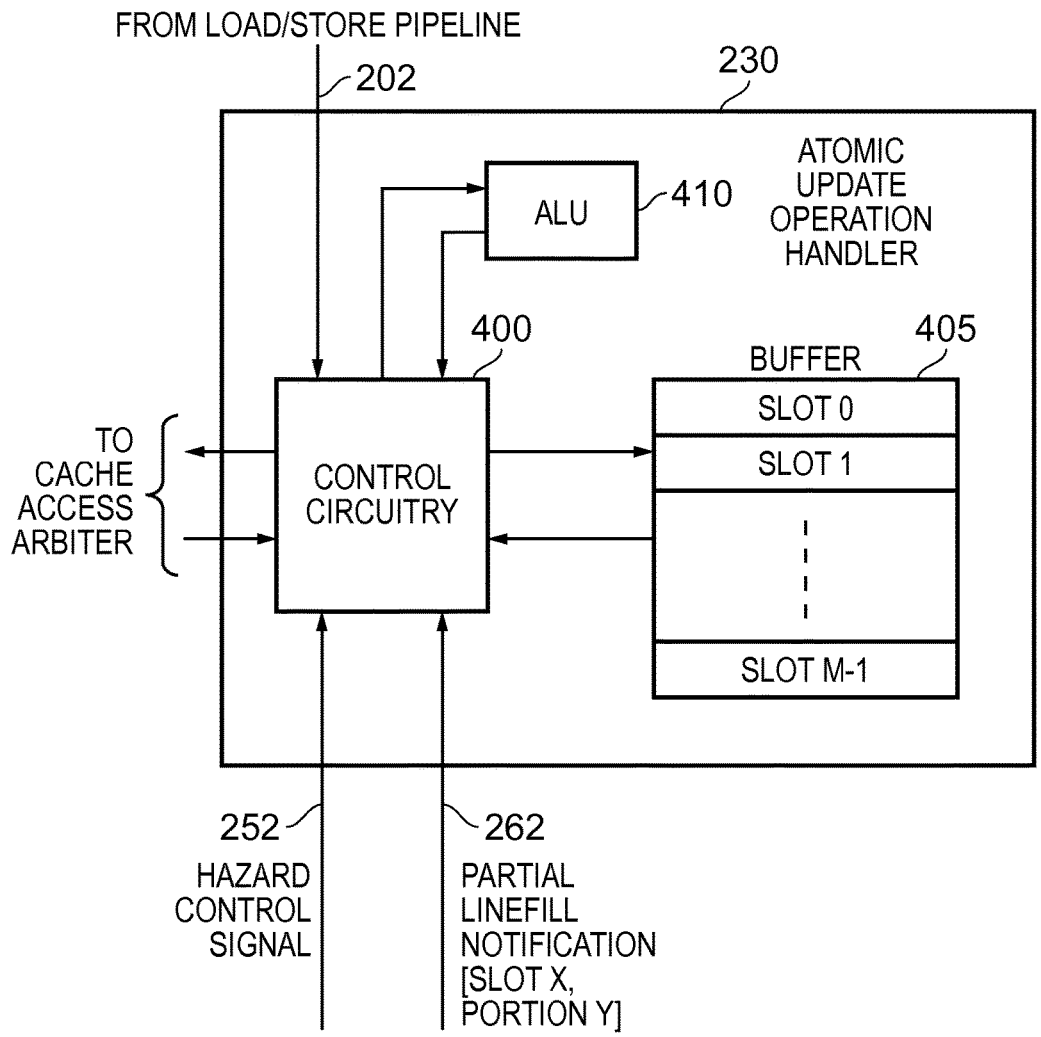
FIG. 5A is a block diagram illustrating components provided within the atomic update operation handler in accordance with one embodiment.

FIG. 5A is a block diagram illustrating components that may be provided with the atomic update operation handler 230 in accordance with one embodiment. Control circuitry 400 is used to control the overall operation and processing of the individual atomic update operations. As each atomic update operation is received from the load/store pipeline over path 202, it is allocated into one of the slots of the buffer 405. Any number of known techniques can be employed for deciding the order in which to perform the operations contained within the various slots of the buffer. For example, in one embodiment the system may be constrained to ensure that atomic operations have to complete in their original program order. However, in an alternative embodiment, the system may allow the operations to be reordered subject to there being no underlying ordering constraints (for example, if two atomic operations were accessing the same address, or if there was a barrier inserted between the two atomic operations, this would necessitate them being performed in order). Once the control circuitry has decided to process a particular atomic update operation, then it sends a cache access request to the cache access arbiter 210 and awaits the response indicative of whether a hit or a miss has been detected within the cache. When the required data is retrieved via the cache access arbiter, then the required update operation will be performed by suitable components within the atomic update operation handler. In one embodiment, an ALU (arithmetic logic unit) 410 is provided for performing various arithmetic logic operations as may be required by the atomic update operations. Typically these operations will involve performing some manipulation on the data retrieved from the cache line, in combination with one or more other values provided as part of the atomic update operation. For example, an add operation may be identified where a value specified by the atomic update operation is added to the value retrieved from the cache in order to produce a result data value for storing back to the cache. When the result data is available, it can then be written back into the relevant cache line via issuance of a suitable control signal to the cache access arbiter 210.

As shown in FIG. 5A, the hazard control signal over path 252 and the partial linefill notifications over path 262 are also routed to the control circuitry 400. Accordingly, in situations where the hazard control signal 252 causes a particular atomic update operation to be deferred, then as each partial linefill notification is received over path 262 specifying the slot number for that deferred atomic update operation, an analysis can be performed using the remaining information in the partial linefill notification to determine whether the associated data portion to which the partial linefill notification relates includes the data that is the subject of the atomic update operation. As discussed earlier, to enable this analysis, the partial linefill notification can include an address portion identifier (labelled as "portion Y" in FIG. 5A), and based on that address information it can then be determined whether the corresponding data portion includes the data at the specified address for the atomic update operation. If so, the atomic update operation can be resumed.

Figure 5B:
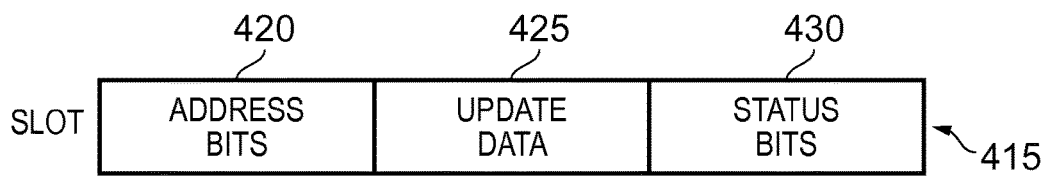
FIG. 5B schematically illustrates fields provided within each slot of the atomic update operation handler's buffer of FIG. 5A in accordance with one embodiment.

FIG. 5B schematically illustrates information that may be maintained within the slots of the buffer 405. Within each slot 415, an address portion 420 will be provided to provide an indication of the address to which the atomic update operation relates. In one embodiment, this address field will comprise a physical address, but in one particular embodiment where the cache is virtually indexed and physically tagged, the address portion may additionally include a number of virtual address bits that are required in order to determine the appropriate index into the cache. A data field 425 is provided for also storing any relevant data relating to the atomic update operation, for example data that is to be used in combination with the data retrieved from the cache line in order to perform the update operation. In addition, each slot may contain various status bits 430 indicative of the status of the associated atomic update operation.

In one embodiment, the atomic update operation handler 230 may actually be incorporated within the store buffer circuitry, in which case the buffer 405 may also be used to store standard store operations. For the store operations, the slots 415 will still essentially provide the same fields 420, 425, 430, but in the event of a store operation the data field 425 is used to hold the data to be stored into the cache line.

Figure 6:
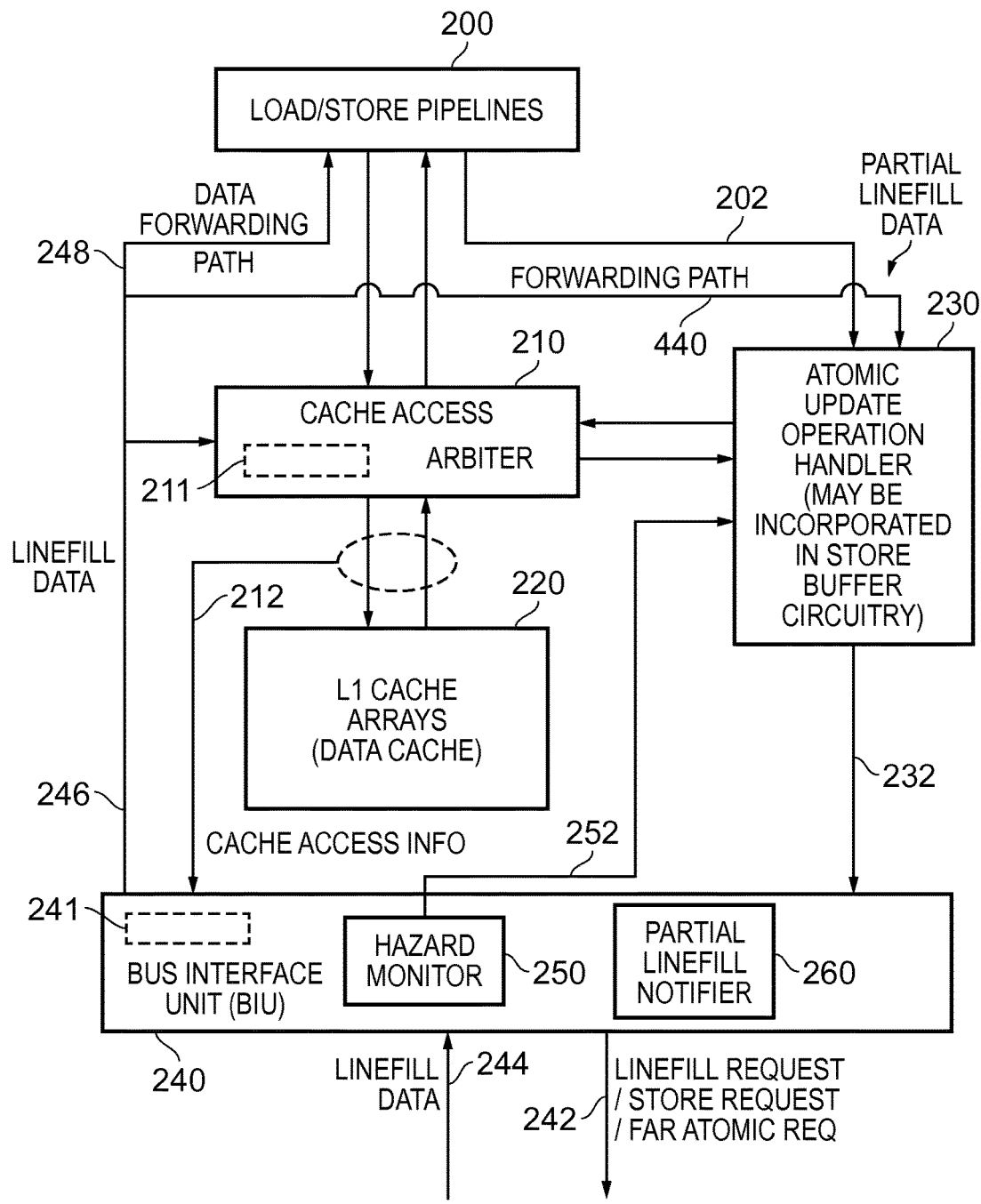
FIG. 6 illustrates how a forwarding path to the atomic update operation handler may be used in accordance with an alternative embodiment.

FIG. 6 illustrates an alternative embodiment to that discussed earlier with reference to FIG. 2, where a forwarding path 440 is also provided to enable the individual data portions of a linefill operation to be forwarded on directly to the atomic update operation handler 230. This data path will typically also be accompanied by sideband information generated by the partial linefill notifier 260 and specifying the address associated with that data portion, and the slot within the atomic update operation handler containing the atomic update operation that has been stalled due to the relevant pending linefill operation.

Whilst this embodiment adds certain cost and complexity due to the need to provide the forwarding path 440, it does enable the atomic update operation handler to be provided directly with the data, hence avoiding the need to reissue the access request to the cache access arbiter.

Figure 7:
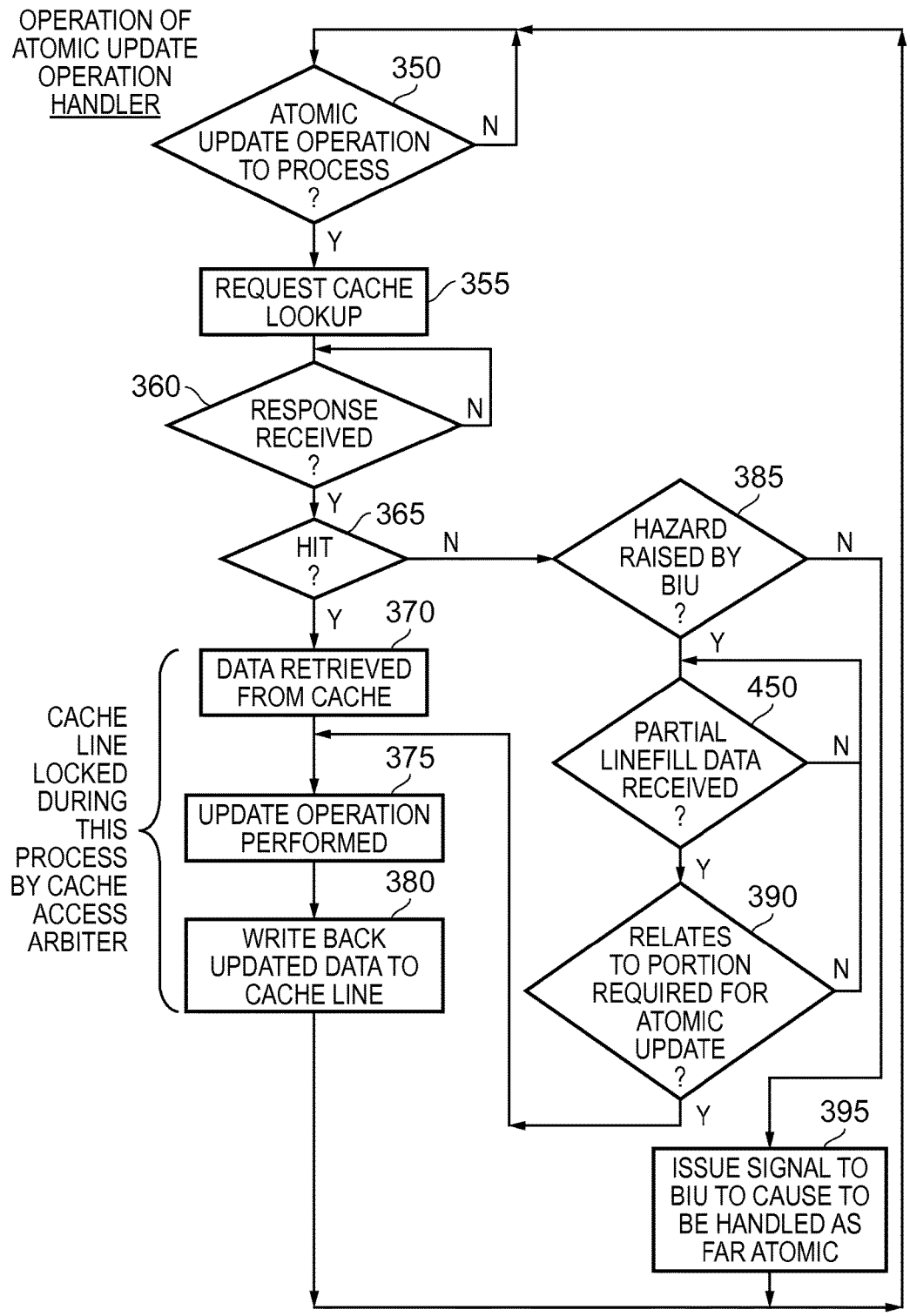
FIG. 7 is a flow diagram illustrating the operation of the atomic update operation handler in accordance with the embodiment of FIG. 6.

This is illustrated schematically with reference to FIG. 7, which is an alternative version of the flow diagram of FIG. 4. In FIGS. 6 and 7, the components/steps that are the same as discussed earlier with reference to FIGS. 2 and 4 are labelled using the same reference numerals, and are not discussed again here.

As can be seen from a comparison of FIG. 7 with FIG. 4, step 387 of FIG. 4 is replaced with step 450 of FIG. 7, where it is determined whether partial linefill data has been received. Using the associated sideband information, it can then be determined at step 390 whether the data portion received over the forwarding path includes the data required for the atomic update operation. If so, then the process can effectively proceed directly to step 375 to perform the update operation, and thereafter perform a write back operation at step 380 to the cache line with the relevant cache data. However, although a separate access request does not need to be issued to the cache access arbiter 210 prior to performing steps 375 and 380, in one embodiment a control signal is still issued to the cache access arbiter to notify the cache access arbiter that the relevant atomic update operation has been resumed, so that the cache access arbiter can lock the relevant cache line whilst the atomic update operation is in progress.

In the embodiment of FIG. 6 where the partial linefill data is forwarded directly over path 440, then this approach can also be used in situations where, instead of buffering data locally within the buffer 211 of the cache access arbiter, the BIU 240 instead buffers the various data portions of a linefill within a buffer 241, and only when all of the data is available does it then request the cache access arbiter 210 to store the cache line's worth of data in the cache. The atomic update operation handler 230 can still be advised via the forwarding path 440 of the presence of the data within the BIU 240, even if that data has not yet been forwarded to the cache access arbiter. When step 380 is reached, and the data is being written back to the effected cache line, then if that effected cache line's data has still not been forwarded from the buffer 241 to the cache access arbiter 210, then the BIU 240 is notified that the atomic update operation handler has performed a write in respect of the particular block of data, and that block of data is cleared within the BIU buffer 241. This ensures that when the BIU buffer contents are subsequently issued to the cache access arbiter 210 to cause a write into the cache line, that write will not overwrite the write data that the atomic update operation handler has written into the cache.

Figure 8:
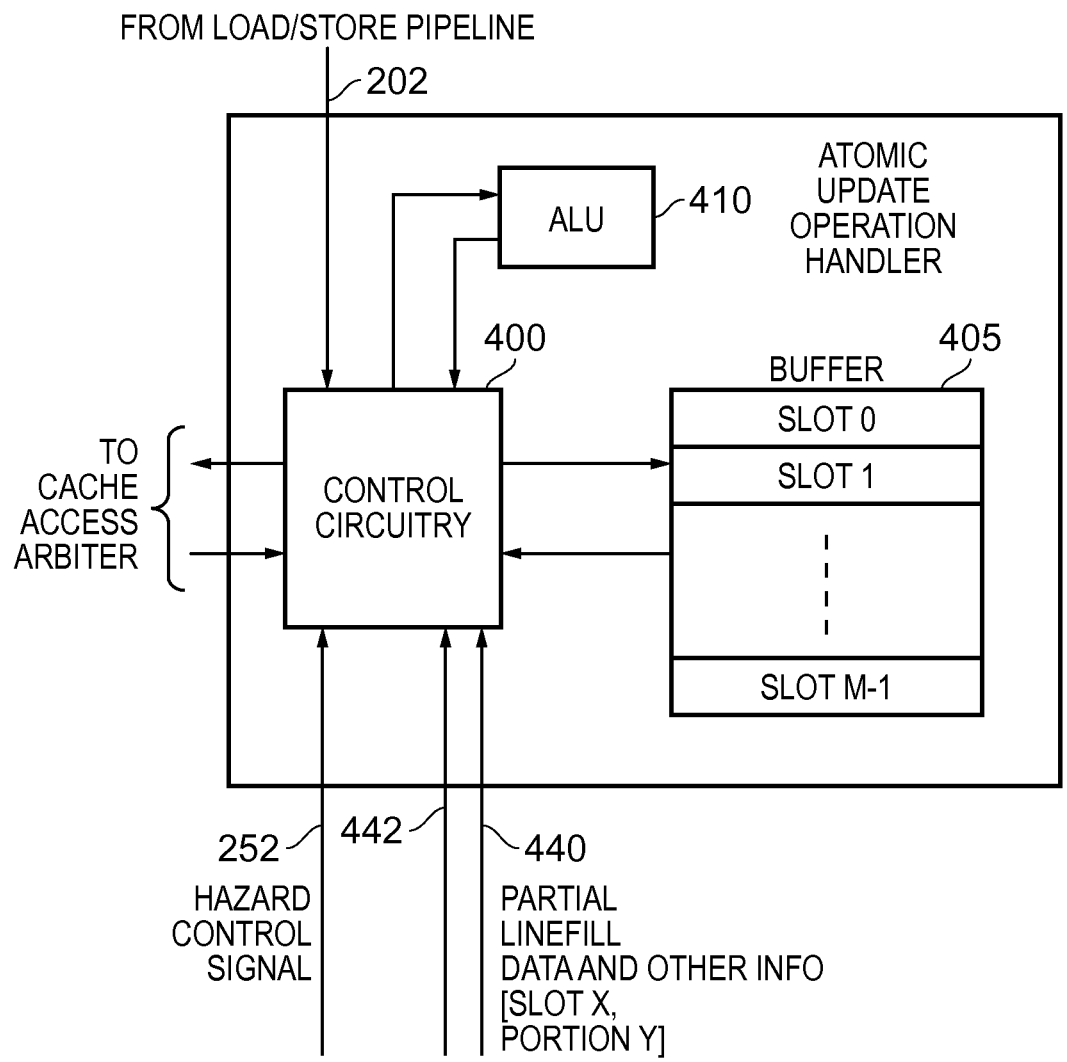
FIG. 8 schematically illustrates how partial linefill data may be provided to the atomic update operation handler in accordance with the embodiment of FIG. 6.

FIG. 8 is a block diagram illustrating components provided within the atomic update operation handler 230 of FIG. 6. From a comparison with the earlier discussed FIG. 5A, it will be seen that the atomic update operation handler is essentially unchanged. However, the control circuitry 400 now receives partial linefill data over path 440, along with other sideband information over path 442. This sideband information can in one embodiment identify the slot within the buffer 405, and an address portion associated with the partial linefill data provided over path 440.

Figure 9:
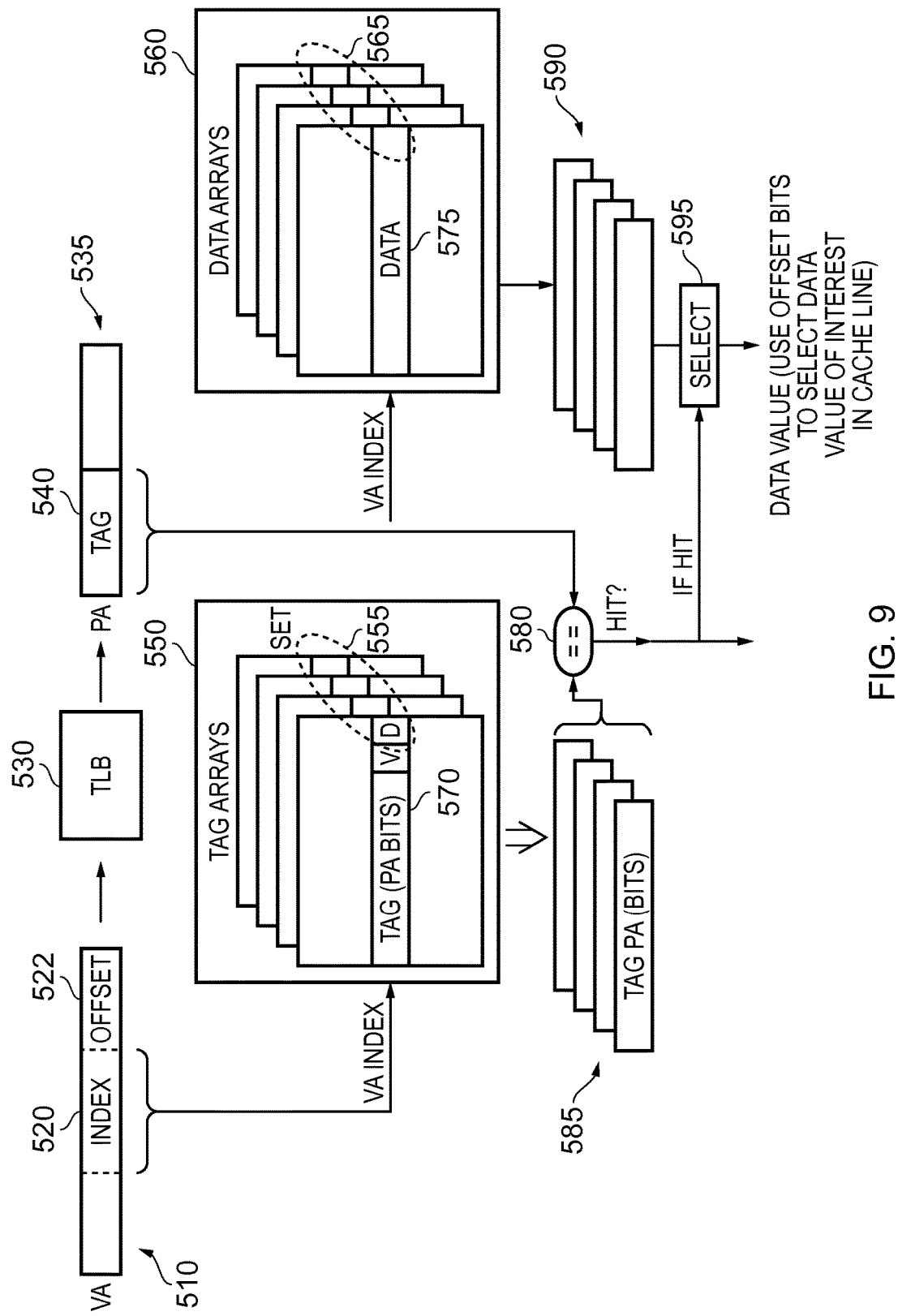
FIG. 9 is a diagram illustrating the operation of a virtually indexed, physically tagged cache that may be used as a level one data cache in accordance with one embodiment.

The cache structures used in the above described embodiments can take a variety of forms. In one embodiment the cache structure subjected to a near atomic operation may take the form of a virtually indexed, physically tagged data cache as illustrated in FIG. 9. Each cache entry within the cache is formed from a tag entry 570 in one of the tag arrays 550 and a corresponding cache line 575 of data values within the corresponding data array 560. The tag arrays 550 are accessed using an index portion 520 of a specified virtual address 510 in order to identify one tag entry from each of the tag arrays, a tag array being provided for each way of the cache. The group of tag entries accessed is referred to as the set, as shown by the reference numeral 555 in FIG. 9.

It will be appreciated that the initial access to the tag arrays 550 can be performed prior to translation of the virtual address to a physical address, since only the index portion 520 from the virtual address 510 is required. However, in a virtually indexed, physically tagged cache, the tag bits held within each tag entry 570 are actually physical address bits, and accordingly the physical address will be required in order to detect whether a hit or a miss has occurred in the cache. Accordingly, in parallel with the initial lookup in the tag arrays 550, a translation lookaside buffer (TLB) 530 can be accessed in order to generate the physical address 535, and hence the relevant tag portion 540 of the physical address which needs to be compared with the tag bits accessed from the tag arrays. As shown schematically in FIG. 9, each tag entry can additionally include certain status bits, such as a valid bit indicating whether the associated cache line of data stores valid data, and a dirty bit indicating whether the data is dirty, i.e. is more up-to-date than the data stored in memory. When accessing the tag arrays using the virtual address index 520, then the various tag bits will be output for any valid entries, as shown schematically by the reference numeral 585. These can then be compared by a comparison block 580 with the physical address tag portion 540. In the event of a match being detected, a hit condition is indicated, identifying that the data that is the subject of the access request is stored in the data arrays 560.

For a load operation, the data arrays 560 can be accessed in parallel with the tag array lookup, in order to access the various cache lines within the set, indicated by the reference numeral 565. The data in the cache lines can then be output, as indicated by the reference numeral 590, so that in the event of a hit the select circuitry 595 can then select the cache line corresponding to the tag entry which caused the hit, with the offset bits 522 from the virtual address being used to identify the particular data value the subject of the access. That data value can then be output from the cache back to the processing circuitry that issued the access request with the virtual address. It will be appreciated that there are a number of ways of accessing the particular required data value within the hit cache line, and for example a sequence of multiplexers may be used to identify the required data value to access.

In the event of a store access request that is cacheable, the data arrays are not accessed in parallel with the tag array access, but instead the physical address is first calculated, and then an entry for the store access request is placed within the store buffer once the load/store pipeline within the processing circuitry has determined that the store operation can be committed, i.e. that the write data to be written to memory is now safe to be written out to memory. Once the write access request has been stored in the store buffer along with the physical address, then a lookup within the tag arrays may be performed, and in the event of a hit the write data specified can be used to update the relevant cache line within the cache. This can happen directly in the event of an exclusive write, where it can be guaranteed that the data is not shared with another core. In the event of a non-exclusive write, even if there is a hit in the cache, the access is treated as a miss, in order to invoke the external snoop circuitry to invalidate any other copies of the data that may be held in other caches, whereafter the data can then be written into the cache.

As mentioned earlier, the atomic update operations used in the described embodiments are also handled in a similar way to store operations, since, when determined to be near atomic, they will involve as part of their operation a store operation in respect of a cache line.

From the above described embodiments, it will be appreciated that such embodiments enable near atomic update operations to be handled more efficiently. In particular, when a near atomic update operation is stalled due to a pending linefill operation, then due to the above described mechanisms it is possible to resume performance of that atomic update operation earlier than might otherwise be the case if completion of the linefill operation were awaited. This is particularly beneficial in situations where the cache line length exceeds the data width by which the various portions of data for the cache line are returned from the lower levels of the cache hierarchy, since in those situations the performance of the linefill operation can require a significant time to complete.

The atomic update operations to which the techniques of the described embodiments can be applied can take a wide variety of different forms. For example, they may involve read-modify-write type operations where a data value is read from a cache line, an arithmetic logic operation is applied to the data read from the cache line, typically by combining it with other data specified by the atomic update operation, and then the result data is written back to the relevant cache line. The arithmetic logic operation may take a variety of forms, for example add, subtract, etc. In other embodiments, the atomic update operation may again read a data value from the cache line, and then perform some manipulation in order to produce a result. However, some analysis of that result may then be performed in order to determine whether there is a need to update the cache line contents, and accordingly the writing back to the cache line is performed selectively dependent on analysis of the result. An example of such an atomic update operation would be a compare and swap operation, where a value is read from the cache, compared with another value specified by the atomic update operation, and then a decision as to whether to write a value back into the cache depends on whether the result of that comparison indicates that the two values are equal or not equal.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus comprising:
a cache storage to store data for access by processing circuitry, the cache storage having a plurality of cache lines;
atomic update handling circuitry to handle performance of an atomic update operation in respect of data at a specified address, the atomic update handling circuitry being arranged, when data at the specified address is stored within a cache line of the cache storage, to perform the atomic update operation on the data from that cache line;
hazard detection circuitry to trigger deferral of performance of the atomic update operation upon detecting that a linefill operation for the cache storage is pending that will cause a chosen cache line to be populated with data that includes data at the specified address, the linefill operation causing the apparatus to receive a sequence of data portions that collectively form the data for storing in the chosen cache line;

partial linefill notification circuitry to provide partial linefill information to the atomic update handling circuitry during the linefill operation; and the atomic update handling circuitry being arranged to initiate the atomic update operation responsive to detecting from the partial linefill information that the data at the specified address is available for the chosen cache line.

2. An apparatus as claimed in claim 1, wherein:

the partial linefill notification circuitry is arranged to provide the partial linefill information to the atomic update handling circuitry to identify when each data portion is available for the chosen cache line during the linefill operation; and the atomic update handling circuitry is arranged to determine from the partial linefill information when the linefill operation has progressed to a point where the data at the specified address is available for the chosen cache line.

3. An apparatus as claimed in claim 1, wherein the partial linefill notification circuitry is arranged to determine when the linefill operation has progressed to a point where the data portions available for the chosen cache line include the data at the specified address, and then to issue as the partial linefill information an indication that the data at the specified address is available for the chosen cache line.

4. An apparatus as claimed in claim 1, wherein the partial linefill information comprises an address portion indicative of a corresponding data portion that is available for the chosen cache line during the linefill operation.

5. An apparatus as claimed in claim 1, wherein:

the atomic update handling circuitry comprises a buffer having a plurality of buffer entries, each buffer entry for storing information relating to a pending operation; and the partial linefill information comprises an indication of the buffer entry for which the partial linefill information is being provided.

6. An apparatus as claimed in claim 1, further comprising:

a data forwarding path coupled to the atomic update handling circuitry and arranged to provide to the atomic update handling circuitry, as at least part of the partial linefill information, the corresponding data portion that is available for the chosen cache line.

7. An apparatus as claimed in claim 6, wherein the atomic update handling circuitry is incorporated within a load/store pipeline of the processing circuitry.

8. An apparatus as claimed in claim 1, wherein the atomic update operation comprises a read-modify-write operation, where the data at the specified address, as available for the chosen cache line, is obtained, a computation is performed to produce a modified data value, and the modified data value is written back to the chosen cache line.

9. An apparatus as claimed in claim 8, wherein the atomic update operation is an atomic load operation where, in addition to the read-modify-write operation, the obtained data at the specified address is output to the processing circuitry.

10. An apparatus as claimed in claim 1, wherein the atomic update operation comprises obtaining the data at the specified address as available for the chosen cache line, performing a computation to produce a result value, and selectively writing a modified data value back to the chosen cache line dependent on the result value.

11. An apparatus as claimed in claim 1, further comprising cache access circuitry to store the data into the chosen cache line during the linefill operation.

12. An apparatus as claimed in claim 11, wherein the cache access circuitry is arranged, whilst the atomic update operation is being performed, to lock the chosen cache line from being accessed at least for any operations that could compromise atomicity of the atomic update operation.

13. An apparatus as claimed in claim 12, wherein the cache access circuitry is arranged, whilst the atomic update operation is being performed, to lock the chosen cache line from being accessed for any snoop operations.

14. An apparatus as claimed in claim 1, wherein the atomic update handling circuitry is provided within store buffer circuitry used to process store operations requested by the processing circuitry.

15. An apparatus as claimed in claim 1, wherein the atomic update handling circuitry is arranged, when data at the specified address is determined not to be stored within a cache line of the cache storage and there is no pending linefill operation for the cache storage that will cause a chosen cache line to be populated with data that includes data at the specified address, to output the atomic update operation for handling by components external to the apparatus.

16. An apparatus as claimed in claim 1, wherein the data at the specified address is available for the chosen cache line once it has been stored within the chosen cache line.

17. An apparatus as claimed in claim 1, wherein the data at the specified address is available for the chosen cache line once it has been locally buffered within the apparatus for storing within the chosen cache line.

18. A method of handling atomic update operations within an apparatus having a cache storage to store data for access by processing circuitry, the cache storage having a plurality of cache lines, the method comprising:

employing atomic update handling circuitry to handle performance of the atomic update operation in respect of data at a specified address, the atomic update handling circuitry being arranged, when data at the specified address is stored within a cache line of the cache storage, to perform the atomic update operation on the data from that cache line;

triggering deferral of performance of the atomic update operation upon detecting that a linefill operation for the cache storage is pending that will cause a chosen cache line to be populated with data that includes data at the specified address;

performing the linefill operation to cause the apparatus to receive a sequence of data portions that collectively form the data for storing in the chosen cache line;

providing partial linefill information to the atomic update handling circuitry during the linefill operation; and initiating the atomic update operation responsive to the atomic update handling circuitry detecting from the partial linefill information that the data at the specified address is available for the chosen cache line.

19. An apparatus comprising:

cache storage means for storing data for access by processing circuitry, the cache storage means having a plurality of cache lines;

atomic update handling means for handling performance of an atomic update operation in respect of data at a specified address, the atomic update handling means, when data at the specified address is stored within a cache line of the cache storage means, for performing the atomic update operation on the data from that cache line;

hazard detection means for triggering deferral of performance of the atomic update operation upon detecting that a linefill operation for the cache storage means is pending that will cause a chosen cache line to be populated with data that includes data at the specified address, the linefill operation causing the apparatus to receive a sequence of data portions that collectively form the data for storing in the chosen cache line;

partial linefill notification means for providing partial linefill information to the atomic update handling means during the linefill operation; and the atomic update handling means for initiating the atomic update operation responsive to detecting from the partial linefill information that the data at the specified address is available for the chosen cache line.

\* \* \* \* \*